United States Patent [19]

Mach

[11] 4,167,480
[45] Sep. 11, 1979

[54] PROCESS FOR DE-SALTING OF WATER AND APPARATUS FOR PERFORMING THIS PROCESS

[76] Inventor: Guido Mach, Rudolf Waisenhorngasse 27, A 1230 Wien-Liesing, Austria

[21] Appl. No.: 852,532

[22] Filed: Nov. 17, 1977

[30] Foreign Application Priority Data

Nov. 23, 1976 [AT] Austria ................................ 8692/76

[51] Int. Cl.² ............................................ B01D 13/00
[52] U.S. Cl. .................................... 210/23 H; 210/79;
210/223; 210/321 R; 210/407; 210/433 M
[58] Field of Search ................. 210/22, 23 H, 79, 222,
210/223, 321 R, 407, 433 M

[56] References Cited

U.S. PATENT DOCUMENTS

| 2,939,830 | 6/1960 | Green et al. ...................... 210/222 X |
| 3,228,878 | 1/1966 | Moody .............................. 210/222 X |
| 3,951,807 | 4/1976 | Sanderson ......................... 210/222 X |

OTHER PUBLICATIONS

Advertisement of Continental Water Cond Corp., from CEP, p. 32, Mar. 1978.

*Primary Examiner*—Ferris H. Lander
*Attorney, Agent, or Firm*—Cushman, Darby & Cushman

[57] ABSTRACT

Process for desalting of water by hyperfiltration (reverse osmosis), characterized in conveying the water to be desalted through at least one magnetic field and keeping the water streaming within the magnetic field and by removing via a throttle area a partial stream of the water to be desalted or of the water enriched in salt, respectively, from the pressure chamber located before the semipermeable membrane.

9 Claims, 3 Drawing Figures

PROCESS FOR DE-SALTING OF WATER AND APPARATUS FOR PERFORMING THIS PROCESS

The present invention refers to a process for desalting of water by hyperfiltration (reverse osmosis).

In a process for desalting of water by hyperfiltration, the water to be desalted is being passed under a pressure exceeding the osmotic pressure along so-called semipermeable membranes which are permeable for water but are impermeable for salts and other substances dissolved in the water, noting that substantially desalted water is passing through the semipermeable membranes and that a solution enriched in dissolved salts and other substances is leaving the hyperfiltration appliance via a throttle valve. Plants for desalting of water by hyperfiltration are already operated in a vast extent, however, practice has shown that the semipermeable membranes in such apparatuses become more or less rapidly clogged to such an extent that the achievable through-put of the hyperfiltration appliance is excessively reduced and that the expensive semipermeable membranes must be exchanged under substantial expenditure of work. When checking such clogged semipermeable membranes, it is found that the pores of the semipermeable membranes are clogged primarily by alkali earth metal carbonates, mainly calcium carbonate, and calcium sulfate. It can be assumed that calcium carbonate and magnesium carbonate are formed within the pores of the semipermeable membranes because on operation of the hyperfiltration appliance carbondioxide is released by the calciumbicarbonate and magnesium bicarbonate, respectively, dissolved in the water and is spontaneously passing through the membrane in direction of the pressure gradient and the calciumcarbonate and magnesiumcarbonate formed under such conditions rapidly fills up the pores of the semipermeable membrane. Calciumsulfate is probably formed within the pores of the semipermeable membranes, because in view of the low solubility of calciumsulfate in water the saturation concentration of the calciumsulfate is soon attained within the concentrated salt solution formed in the hyperfiltration appliance, which results in crystallizing of calciumsulfate within the pores of the semipermeable membranes. These phenomena occurring in hyperfiltration appliances were already recognized very soon and the attempt was made to avoid them by removing from the water to be desalted the substances responsible for the water hardness, i.e. mainly calciumbicarbonate, magnesiumbicarbonate and calciumsulfate, by the usual measures, for example by precipitating the calcium and magnesium by means of sodium carbonate and/or trisodium phosphate or by means of ion exchangers, which, however, resulted in such a substantial increase of the operating costs for hyperfiltration appliances that they scarcely were competitive with destillation plants used for desalting of the water.

It has been found that it is possible to overcome the mentioned difficulties encountered with a process for desalting of water by hyperfiltration (reverse osmosis) in a simple, surprising and—for the time being—theoretically inexplicable manner by conveying, according to the invention, the water to be desalted through at least one magnetic field and keeping the water streaming within the magnetic field and by removing via a throttling area a partial stream of the water to be desalted or of the water enriched in salt, respectively, from the pressure chamber located before the semi-permeable membrane. When practically working according to the inventive process it has been shown that it becomes possible to smoothly operate a hyperfiltration appliance of known construction for several years when desalting brackish water having a salt content of approximately 12 g/l and having been obtained from wells located in coastal areas, in spite of the hyperfiltration appliance being no more operable after at least two months of operation if the water to be desalted had not previously been treated in a magnetic field.

The problem encountered in a process for desalting of water by hyperfiltration is principally different from the problem encountered when treating boiler feed water (cf. Austrian Patent Specification Nos. 187 054, 183 699 and 195 853 and U.S. Pat. Nos. 2,825,464 and 3,680,705) and the problem encountered when treating water for irrigation purposes (cf. Austrian Patent Specification No. 196,809), respectively. In a process for treating of boiler feed water in a magnetic field, alkaline earth metal carbonates are being precipitated from the dissolved alkaline earth metal bicarbonate during the subsequent heating of the water within the boiler and the alkaline earth metal carbonates remain within the boiler until the sludge formed within the boiler is being removed therefrom. It appears rather doubtful whether, if sea water containing salts responsible for the hardness of water has been heated for the purpose of precipitating alkaline earth metal carbonates and sea water treated in such a manner is—i.e. withour prior removal of the precipitated alkaline earth metal carbonates by filtration—being subjected to a hyperfiltration for removing alkaline metal salts, the semipermeable membranes do not become clogged by the precipitated alkaline earth metal carbonates within short, particularly when considering that when desalting water by hyperfiltration the water to be desalted is being pressed through the semipermeable membranes with an extremely high pressure for the purpose of attaining a high through-put. A succes attained by pre-treating of boiler feed water in a magnetic field does thus not necessarily allow to conclude a success when treating in a magnetic fields water to be desalted by hyperfiltration.

Also a success achieved in a process for treating irrigation water in a magnetic field does not allow to conclude a success in a process for desalting of water by hyperfiltration, because the semipermeable membranes of plant roots are continuously growing and solely for this reason produce fresh permeable areas of the semipermeable membranes of the roots and because the vegetable acids released by the plant roots dissolve without any further sediments of alkaline earth metal carbonates within the pores of the plant roots, insofar as such sedimentations of alkaline earth metal carbonates are formed within the pores of the plant roots at all, because the earth surrounding the plant roots acts as a filter which prevents alkaline earth metal carbonate formed, if any, from reaching the plant roots. Such favorable conditions as are existent with the semipermeable membranes of plant roots (growth ability and ability for self-purificatio are, however, not existent for the semi-permeable membranes of hyperfiltration appliances, and, in addition, the water through-put, based on unit of area and unit of time, through the semi-permeable membranes of the plant roots, is, as compared with the corresponding through-put through the semipermeable membranes of hyperfiltration appliances, infinitely small so that there does not exist the danger that substances clogging the pores of the semipermeable membranes of the plant roots are pressed into these pores with high velocity.

In the process according to the invention, the water to be desalted is being passed through the magnetic field, preferably with a flow velocity of at least 0.1 m/sec, particularly 0.5 m/sec. From the standpoint of the effect to be achieved, there apparently does not exist an upper limit for the flow velocity for the water to be desalted through the magnetic field, however, the practically attainable flow velocity of the water through the magnetic field has its upper limit for reasons pertaining to the apparatus only. When working with a flow velocity of 0.1 m/sec a fully satisfactory success could be achieved, so that it is quite probable that also when working with lower flow velocities the hyperfiltration appliance can be satisfactorily operated.

A preferred embodiment of an apparatus for performing the process according to the invention comprises a desalting appliance formed of a hyperfilter and is, according to the invention, characterized in that before the hyperfilter at least one device for generating a magnetic field is arranged, the magnetic field of that device crossing the path of flow of the water to be desalted, and in that a conduit is, via a throttle valve, leading out of the pressure chamber of the hyperfilter, which pressure chamber is seen in direction of flow located before the semipermeable membrane. Conveniently and according to the invention, the device generating the magnetic field is arranged at the water entry of the desalting device, because it can be assumed that the effect of the magnetic field on the water to be desalted and streaming through the magnetic field does not last arbitrarily long and because it is a matter of convenience to arrange the device generating the magnetic field as near as possible to the entrance for the water to be desalted of the desalting appliance. Which distance is selected between the device generating the magnetic field and the desalting appliance and which time interval is allowed to lapse between passing the water to be desalted through the magnetic field and supplying the water to be desalted to the desalting appliance, without severely detracting from the effect to achieve, can be made the subject of theoretical and practical investigations, which, however, do not materially change the principles of the present invention. The high pressure pump which supplies the water to be desalted to the hyperfilter is, as seen in direction of flow of the water, conveniently arranged before the device generating the magnetic field.

According to the invention the arrangement can be such that magnets are with their pole shoes applied to the outer side of the supply conduit for the water to be desalted and are conveniently applied at diametrically opposed areas of this conduit and in that the supply conduit for the water to be desalted to the desalting appliance consists at the area of the magnetic field of non-ferromagnetic material, preferably of synthetic plastics material. This provides the advantage that the magnetic field is mainly crossing at a right angle the path of flow of the water to be desalted.

According to the invention it is, however, also possible to arrange within the supply conduit for the water to be desalted to the desalting appliance at least one magnet, preferably at least one permanent magnet. The particular advantage resulting from arranging magnets within the interior of the supply conduit for the water to be desalted results from the fact that the water to be desalted must stream through those areas of the magnetic field produced by the magnets where there exists the highest field strength. Permanent magnets have the advantage that no separate energy sources are required for generating the required magnetic field. The magnetic field strength being effective within the path of flow of the water to be desalted, can, with given magnets and according to the invention, be simply increased if the supply conduit is within the area of action of the magnetic field surrounded by a sheath of ferromagnetic material or if the supply conduit consists of ferromagnetic material which is, if desired, coated with synthetic plastics material. Also by this measure, the major part of the magnetic field is acting at a right angle to the path of flow of the water to be desalted.

It is principally sufficient to provide only one device generating a magnetic field, it is, however, advantageous to provide for safety purposes, several devices for generating magnetic fields because the one or the other of the devices for generating magnetic fields can become disturbed for some reasons.

For subjecting the water to be desalted to the influence of the devices generating magnetic fields in an as far as possible uniform manner, it is, according to the invention, convenient to arrange within the supply conduit, usually having a circular cross-section, for the water to be desalted, the magnets in axial direction, preferably coaxially relative to the wall of the supply conduit. Thereby, it has proved most favorable to arrange, according to the invention, the magnets with poles of opposed polarity facing one another, thereby keeping free a pole gap. The width of the pole gap can, according to the invention, be 0.5 to 10 cm, preferably 2 to 6 cm, particularly 4 cm. Pole gaps below 0.5 cm frequently result in too weak a magnetic stray field outside the edges of the magnets, whereas a pole width of more than 10 cm frequently results in too low a magnetic field strength between the magnetic poles.

It has proved convenient to support, according to the invention, the magnets within the area of their neutral zones in an electrically insulated manner. It has further proved convenient to provide as magnets axially magnetized bar magnets the length of which preferably is greater than their diameter.

When treating water to be desalted which is contaminated by suspended articles or coarser material it is obviously convenient to remove such material, for example by filtration, from the water to be desalted before it enters the desalting appliance of the device generating the magnetic field.

The invention is further illustrated with reference to the annexed drawing.

Figure 1:
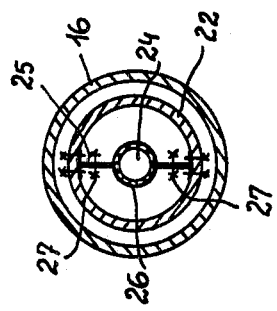
FIG. 1 represents a block diagram of an apparatus for desalting of water.

In the desalting apparatus for salt-containing water schematically shown in FIG. 1, the salt-containing water is sucked from a well 1 by means of a pump 2 and then pressed by this pump first through a coarse filter 3 and then through a fine filter 4, which is as a rule a sand bed filter, whereupon the water leaving the fine filter is led through an apparatus 5 for performing the inventive process and the water leaving said apparatus 5 is pressed by means of a high-pressure pump 6 via a conduit 7 into a hyperfilter 8 from which substantially desalted water is leaving via a conduit 9 and water enriched in salt is leaving via a conduit 10 into which an adjustable throttle valve 11 is interposed for maintaining within the hyperfilter the pressure required for the reverse osmosis and being as a rule higher than 30 at, for instance about 100 at. The filters 3 and 4 are socalled scavenging filters, from which the suspended particles retained within the filter bed are being removed by rinsing the filter bed with water supplied via the conduits 3a and 4a, respectively. The hyperfilter 8 can be a hyperfilter of any known construction in which the semipermeable membranes are formed of films or hollow fibres of polyvinylacetate or of polyamides.

Figure 3:
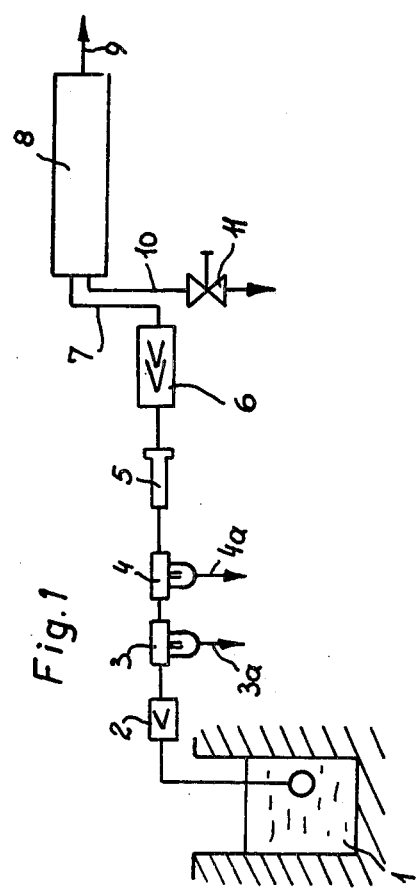
FIG. 3 is a section along the line III—III of FIg. 2.
Figure 2:
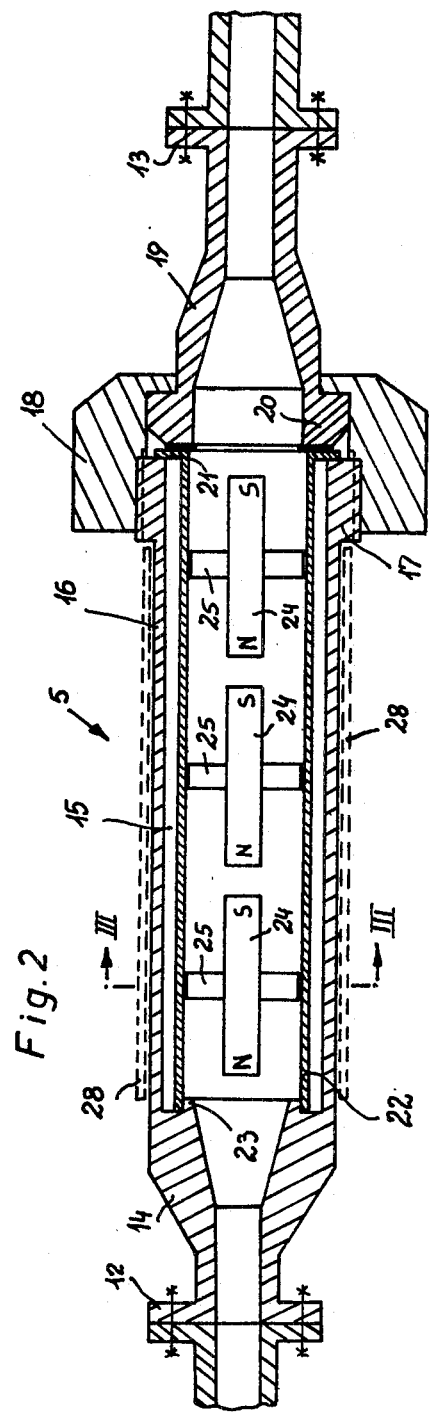
FIG. 2 is an axial section through an embodiment of an apparatus for performing the inventive process.

A practically operated embodiment of an apparatus for performing the process according to the invention is shown in FIG. 2. This apparatus 5 essentially is a tubular shape which can be interpositioned into the supply conduit for water to be desalted by means of the flanges 12 and 13 provided at both ends of said shape. A connecting piece 14 extends from flange 12 and is widening up to a tubular chamber 15, the wall 16 of which is at its end opposing the flange 12 provided with a flange 17 which in turn is provided with an external thread. A hexagonal nut 18 is screwed on the flange 17 for sealingly pressing a flange 20 of a connecting piece 19 integral with flange 13 against the flange 17. A cylindrical bushing 22 is inserted into the tubular chamber 15 and provided at the area of flange 17 with a flange 21, said cylindrical bushing 22 being centered within the tubular chamber 15 with its end opposing its flange by means of a centering ring 23 protruding from the connecting piece 14 in axial direction and having its flange 21 sealingly pressed between the flange 17 and the flange 20 of the connecting piece 19. In the practically operated embodiment of the inventive apparatus all above mentioned parts of the apparatus consist of hard polyvinylchloride. Within the cylindrical bushing 22, three permanent magnets 24 are coaxially arranged relative to said cylindrical bushing, said magnets showing with poles of equal polarity in the same direction and being supported at the centers thereof, i.e. in their neutral zones, by means of pairs 25 of support clamps (cf. also FIG. 3). These pairs 25 of support clamps consist of non-ferromagnetic material, for example brass, and are electrically insulated relative to the permanent magnets consisting of an alloy of high permeability, for example a titanium-cobalt-nickel-aluminum-alloy (Ticonal), by means of an intermediate ring 26 consisting of insulating material, for example polyethylene or polyvinylchloride. The individual support clamps of the support clamp pairs 25 are pressed one against the other by means of screws 27 and bent at an angle at the area of the wall of the cylindrical bushing 22 and screwedly connected there to the cylindrical bushing 22. The embodiment described provides a simple possibility to remove the cylindrical bushing 22 carrying the magnets in case it should become necessary to clean the interior of the cylindrical bushing or to replace the magnets by fresh ones.

For the purpose of establishing—for given magnets—a higher field strength within the flow path of the water to be desalted, a bushing 28 of ferro-magnetic material, for example iron, can be shifted over the wall 16 of the tubular chamber 15, said bushing 28 being shown with dashed lines in FIG. 2. For the same purpose, the cylindrical bushing 22 could also consist of ferromagnetic material, in this case, however, it is to recommend to provide the cylindrical bushing 22 with a layer of synthetic plastics material, for example a layer of polyethylene, to prevent corrosion of the cylindrical bushing under the influence of the salt-containing water.

In the mentioned practically operated apparatus the permanent magnets 24 consist of Ticonal and have a length of 100 mm and a diameter of 20 mm, said permanent magnets being arranged with a pole distance of 40 mm, coaxially within a cylindrical bushing 22 having an outer diameter of 50 mm and a wall thickness of 3 mm, noting that the outer diameter of the wall 16 of the tubular chamber 15 was 63 mm and the wall thickness of this wall 16 was 5 mm.

What I claim is:

1. In a process for desalting water by passing a stream of water to be desalted to a reverse osmosis system having a high pressure chamber which receives the stream of water to be desalted and which discharges a stream of water enriched in salt and having semipermeable membrane means through which essentially desalted water passes from the high pressure chamber to a desalted water chamber, the improvement comprising passing the stream of water to be desalted, prior to its passage through the semipermeable membrane means, through at least one magnetic field so that clogging of the pores of the semipermeable membrane means in the reverse osmosis system is reduced.

2. A process as in claim 1 including throttling a discharge stream from the high pressure chamber of the reverse osmosis system.

3. A process as in claim 1 wherein the stream of water to be desalted passes through the magnetic field at a velocity of at least 0.1 meters/sec.

4. A process as in claim 3 wherein the velocity is at least 0.5 meters/sec.

5. A process as in claim 1 wherein the magnetic field crosses the path of flow of the stream of water to be desalted.

6. A process as in claim 5 wherein the stream of water to be desalted is filtered prior to passing through the magnetic field and thereafter flows to the semipermeable membrane without further filtering.

7. In apparatus for desalting water of the kind including a reverse osmosis unit having a high pressure chamber, an inlet for passing water to be desalted to the high pressure chamber, an outlet for discharging water enriched in salt from the high pressure chamber, semipermeable membrane means through which water from the high pressure chamber passes to a desalted water chamber, and an outlet for discharging a stream of essentially desalted water from the desalted water chamber, the improvement comprising means for treating the stream of water to be desalted, before the same passes through the semipermeable membrane means, with a magnetic field so as to reduce clogging of the semipermeable membrane means, said device including means for generating a magnetic field through which the stream flows, the magnetic field having a direction which crosses the path of flow of the stream.

8. Apparatus as in claim 7 including means for throttling a discharge stream from the high pressure chamber.

9. Apparatus as in claim 7 wherein said device is located at said inlet.

* * * * *